(12) United States Patent
Hsieh et al.

(10) Patent No.: US 7,766,676 B2
(45) Date of Patent: Aug. 3, 2010

(54) ELECTRONIC DEVICE

(75) Inventors: Meng-Hung Hsieh, Taipei Hsien (TW); Chun-Fa Liao, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/411,346

(22) Filed: Mar. 25, 2009

(65) Prior Publication Data
US 2009/0263994 A1    Oct. 22, 2009

(30) Foreign Application Priority Data
Apr. 22, 2008    (CN) .................... 2008 1 0301246

(51) Int. Cl.
*H01R 13/44* (2006.01)
(52) U.S. Cl. ...................................... 439/136
(58) Field of Classification Search ............... 439/136, 439/76.1, 942, 374
See application file for complete search history.

(56) References Cited

U.S. PATENT DOCUMENTS

| 5,738,536 | A  | * | 4/1998 | Ohgami et al. | 439/142 |
| 5,769,646 | A  | * | 6/1998 | Cavello et al. | 439/136 |
| 6,406,321 | B1 | * | 6/2002 | Hayashi et al. | 439/374 |
| 6,942,519 | B2 | * | 9/2005 | Chen | 439/501 |

* cited by examiner

*Primary Examiner*—Jean F Duverne
(74) *Attorney, Agent, or Firm*—Frank R. Niranjan

(57) ABSTRACT

An electronic device includes an enclosure, a protecting member, and a power plug. The enclosure includes a top wall, a bottom wall, sidewalls, a socket, and a slot to receive an electronic card. The socket and the slot are defined in one of the sidewalls. The protecting member includes a receiving portion bounding the socket and the slot and a sliding plate capable of sliding to an open position and a closed position in the receiving portion. Movement of the sliding plate in the open position does not allow insertion of the power plug into the socket and allows the electronic card to be inserted into or removed from the slot, and movement of the sliding plate in the closed position allows insertion of the power plug into the socket and does not allow the electronic card to be inserted into or removed from the slot.

8 Claims, 3 Drawing Sheets

ELECTRONIC DEVICE

BACKGROUND

1. Technical Field

The present disclosure generally relates to electronic devices, and more particularly to an electronic device with an electronic card protecting member.

2. Description of Related Art

An electronic device usually includes varied connectors for electrically connecting extensions, such as a flash drive, a microphone, and so on, and varied empty slots for receiving electronic cards. However, in use, the electronic card may be damaged if the slot fills with dust or the electronic card is inserted or pulled out while the electronic device is powered on.

Therefore, a need exists in the industry to overcome the described limitations.

DETAILED DESCRIPTION OF THE EMBODIMENTS

Figure 1:
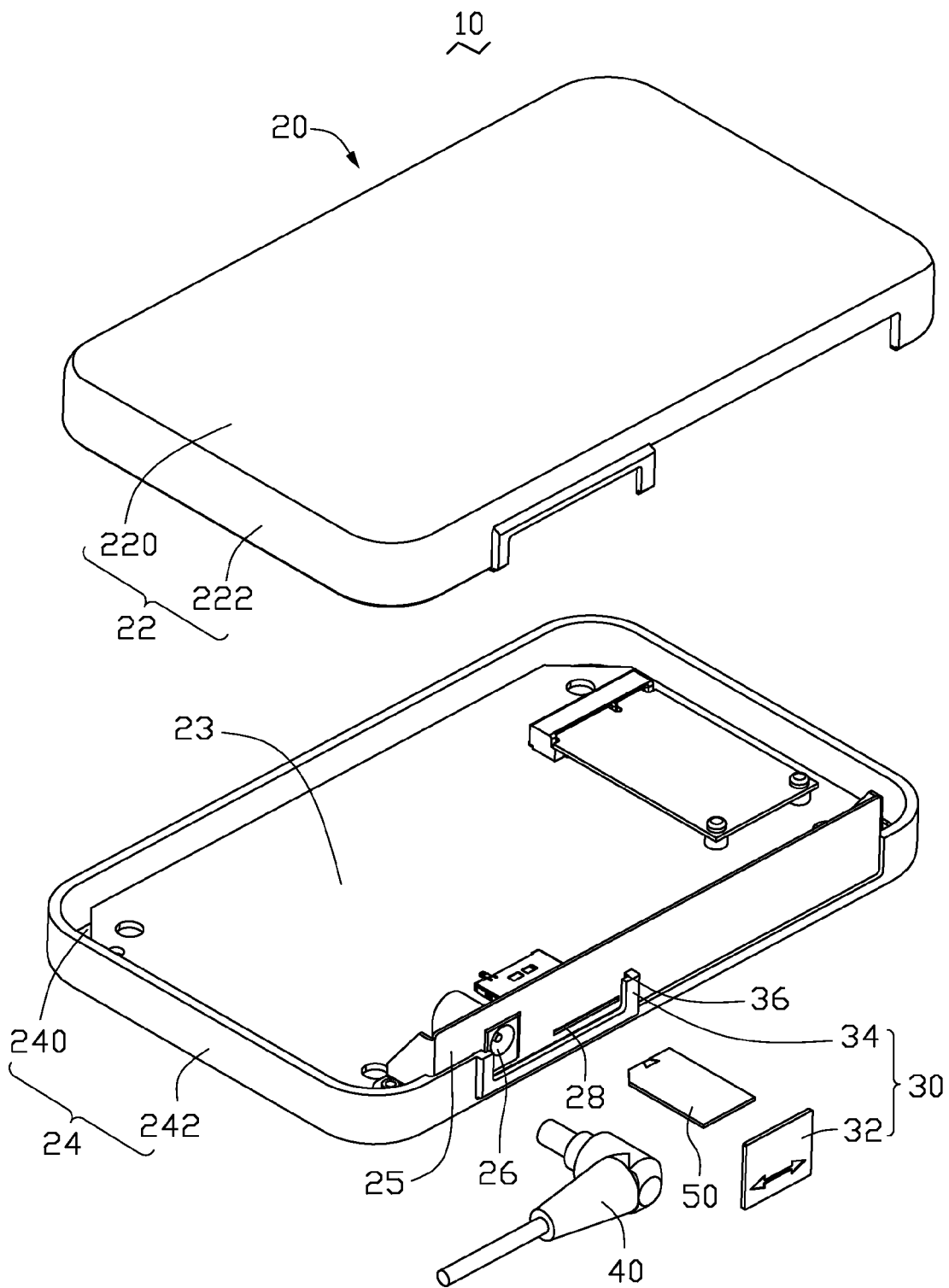
FIG. 1 is an exploded, isometric view of an electronic device of an exemplary embodiment of the disclosure.

FIG. 1 is an exploded, isometric view of an electronic device 10 of an exemplary embodiment of the present disclosure. The electronic device 10 includes an enclosure 20, a protecting member 30, and a power plug 40. Alternatively, the electronic device 10 also includes an electronic card 50. The electronic device 10 may be a mobile computer, such as a laptop, or a mobile internet device (MID), but the disclosure is not limited thereto.

The enclosure 20 is configured for accommodating electronic elements, such as, printed circuit boards (PCBs), batteries, a central processing unit (CPU), etc. The enclosure 20 is substantially rectangular and it will be understood that other configurations may be utilized. The enclosure 20 includes a top wall 220, a bottom wall 240, a plurality of first exterior sidewalls 222, and a plurality of second exterior sidewalls 242.

In the illustrated embodiment, the top wall 220 and the first exterior sidewalls 222 cooperatively define a cover 22 of the enclosure 20, while the bottom wall 240 and the second exterior sidewalls 242 cooperatively define a base 24 of the enclosure 20. Although a two-part portion of the enclosure 20 is shown for purpose of illustration, it will be understood that the top wall 220, the bottom wall 240, the first exterior sidewalls 222, and the second exterior sidewalls 242 can also be formed from one or more individual panels that are assembled in the enclosure 20.

In the illustrated embodiment, the cover 22 is mechanically connected to the base 24, where a receiving space 23 is formed in an interior of the enclosure 20 for receiving the electronic elements. Alternatively, the receiving space 23 may be formed in an interior of the cover 22 or the base 24.

The enclosure 20 further includes an interior sidewall 25, a socket 26, and a slot 28. The interior sidewall 25 extends upward from the bottom wall 240, and is mechanically connected to one of the second exterior sidewalls 242. In the illustrated embodiment, the first exterior sidewalls 222 and the second exterior sidewalls 242 cooperatively define exterior sidewalls, and the exterior sidewalls and the interior sidewall 25 cooperatively define sidewalls.

Alternatively, the interior sidewall 25 may extend downward from the top wall 220, and is mechanically connected to one of the first exterior sidewalls 222.

The socket 26 and the slot 28 are defined in the interior sidewall 25, and are spaced from each other. The electronic card 50 is received in the slot 28. The power plug 40 is inserted into the socket 26 for providing power to the electronic device 10.

Alternatively, the socket 26 and the slot 28 may be defined in one of the first exterior sidewalls 222 or one of the second exterior sidewalls 242. The first exterior sidewalls 222 and the second exterior sidewalls 242 cooperatively define the sidewalls. That is, the enclosure 20 has no interior sidewall 25.

The protecting member 30 is configured for protecting the electronic card 50 received in the slot 28, and includes a receiving portion 34 and a sliding plate 32 slidably received in the receiving portion 34. The receiving portion 34 projects from one of the exterior sidewalls connected to the interior sidewall 25. In the illustrated embodiment, the receiving portion 34 is divided into two parts, one part projects from the cover 22, and the other projects from the base 24. The receiving portion 34 defines a frame, and bounds the socket 26 and the slot 28. The receiving portion 34 defines a groove 36.

The sliding plate 32 is configured for covering the slot 28 in order to prevent the slot 28 from collecting dust. The sliding plate 32 is received in the receiving portion 34, and can slide in the groove 36. In the illustrated embodiment, the receiving portion 34 and the enclosure 20 are integrally formed. Alternatively, the receiving portion 34 may be mechanically connected to the enclosure 20.

In assembly, the cover 22 is mechanically connected to the base 24. The sliding plate 32 is received in the groove 36. The power plug 40 is inserted into the socket 26. Thus, the enclosure 20, the protecting member 30, and the power plug 40 are assembled in the electronic device 10.

Figure 2:
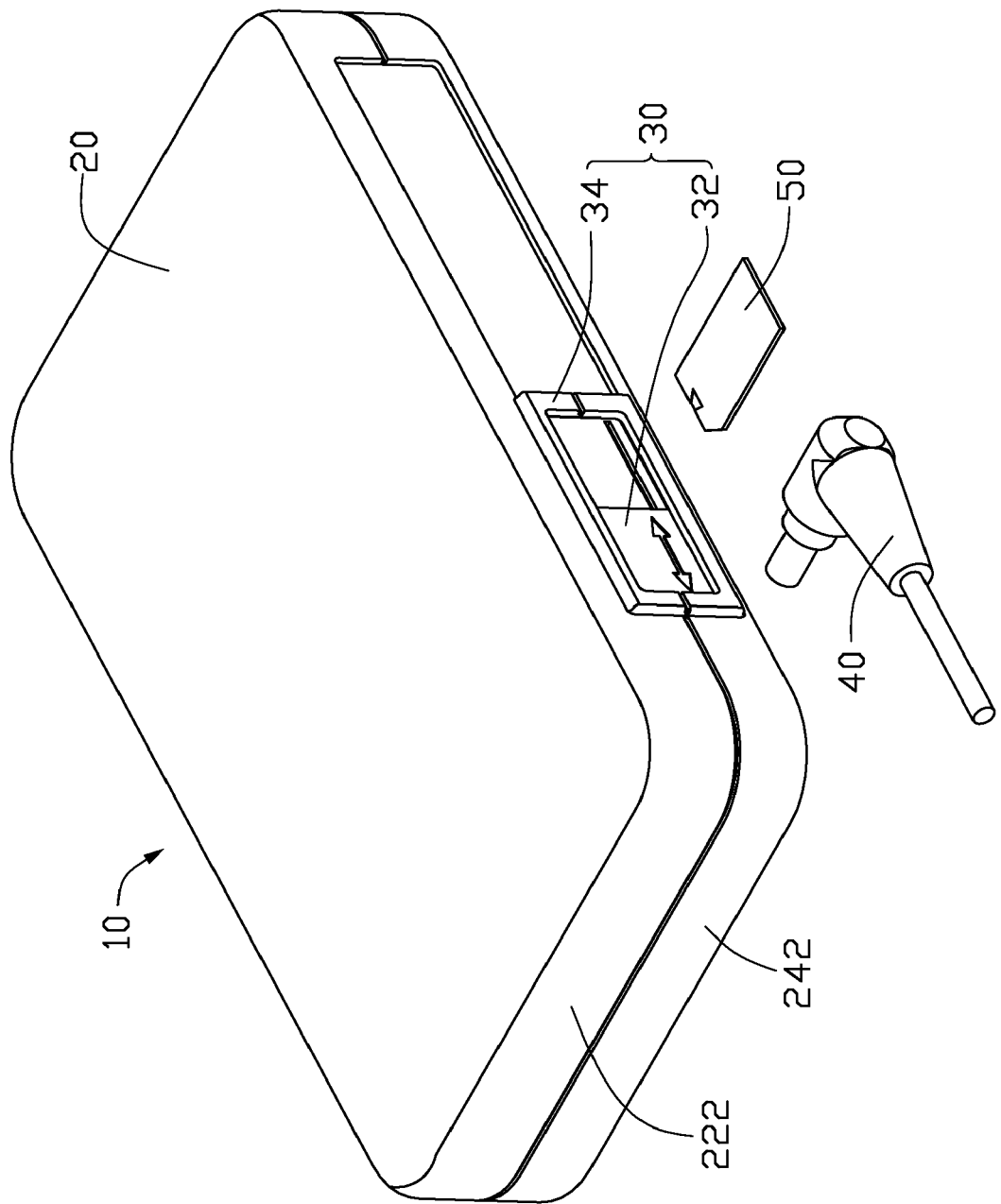
FIG. 2 is an assembled view of FIG. 1, showing a sliding plate in an open position.
Figure 3:
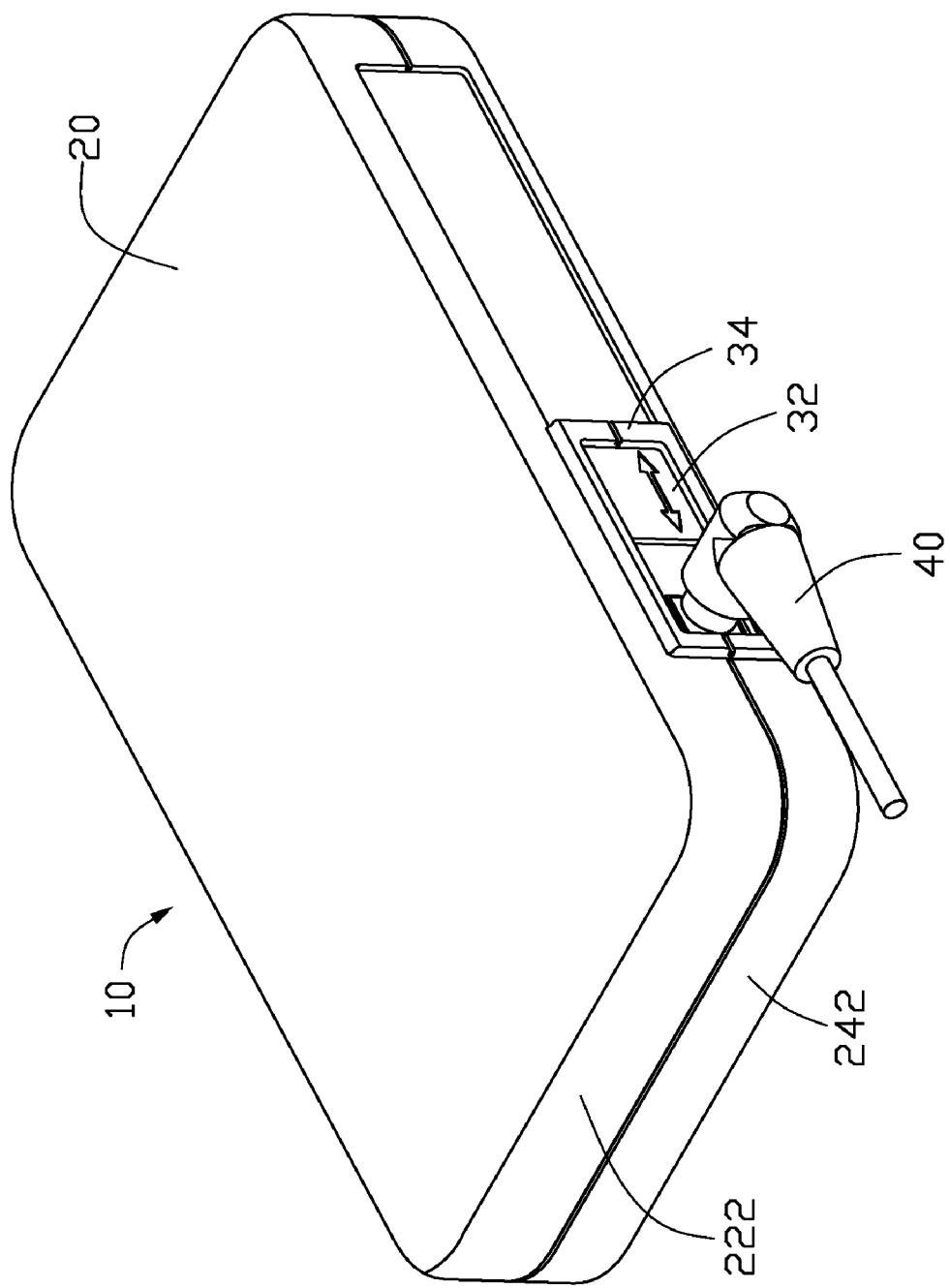
FIG. 3 is similar to FIG. 2, but showing the sliding plate in a closed position.

FIG. 2 is an assembled view of the electronic device 10, showing the sliding plate 32 being in an open position. FIG. 3 is an assembled view of the electronic device 10, showing the sliding plate 32 being in a closed position. In the open position, the power plug 40 is pulled out of the socket 26 so that the electronic device 10 is in a power off state. Accordingly, the slot 28 is exposed so the user can insert or pull the electronic card 50 into or out of the slot 28. That is, only if the electronic device 10 is in the power off state, can the user insert or pull the electronic card 50 into or out of the slot 28. Thus, the electronic card 50 is protected from damage during the course of electronic card 50 being inserted or pulled out. In the closed position, the sliding plate 32 covers the slot 28, as a result, the electronic card 50 is protected from the dust and the power plug 40 can be inserted into the socket 28. In the illustrated embodiment, only if the power plug 40 is pulled out of the socket 26, can the sliding plate 32 slide in the groove 36 to expose the slot 28 in order to insert or remove the electronic card 50 into or from the slot 28. That is, interference between the power plug 40 and the sliding plate 32 results in the electronic card 50 being insertable into or removable from the slot 28 only if the electronic device 10 is in the power off state. In other words, the sliding plate 32 is capable of sliding to the open position and the closed position in the receiving portion 34 such that movement of the sliding plate 32 in the open position does not allow insertion of the power plug 40 into the socket 26 and allows the electronic card 50 to be inserted into or removed from the slot 28. Furthermore, movement of the sliding plate 32 in the closed position allows insertion of the power plug 40 into the socket 26 and does not allow the electronic card 50 to be inserted into or removed from the slot 28.

While an embodiment of the present disclosure has been described, it should be understood that it has been presented by way of example only and not by way of limitation. Thus the breadth and scope of the present disclosure should not be limited by the above-described exemplary embodiments, but should be defined only in accordance with the following claims and their equivalents.

What is claimed is:

1. An electronic device comprising:
   an enclosure accommodating a plurality of electronic elements therein, the enclosure comprising a top wall, a bottom wall, a plurality of sidewalls, a socket, and a slot to receive an electronic card, the socket and the slot defined in one of the sidewalls, the top wall, the bottom wall, and the sidewalls cooperatively defining a receiving space to receive the plurality of electronic elements;
   a protecting member to protect the electronic card, the protecting member comprising a receiving portion and a sliding plate capable of sliding to an open position and a closed position in the receiving portion, the receiving portion bounding the socket and the slot; and
   a power plug inserted into the socket of the enclosure to provide power to the electronic device;
   wherein movement of the sliding plate in the open position does not allow insertion of the power plug into the socket and allows the electronic card to be inserted into or removed from the slot, and wherein movement of the sliding plate in the closed position allows insertion of the power plug into the socket and does not allow the electronic card to be inserted into or removed from the slot.

2. The electronic device as recited in claim 1, wherein the receiving portion and the enclosure are integrally formed.

3. The electronic device as recited in claim 2, wherein the receiving portion projects from one of the sidewalls.

4. The electronic device as recited in claim 1, wherein the receiving portion defines a frame.

5. The electronic device as recited in claim 4, wherein the receiving portion comprises a groove, and the sliding plate slides in the groove to the open and the closed positions.

6. The electronic device as recited in claim 1, wherein the sidewalls comprises a plurality of exterior sidewalls and an interior sidewall, wherein the interior wall is mechanically connected to one of the exterior sidewalls.

7. The electronic device as recited in claim 6, wherein the socket and the slot are defined in the interior sidewall.

8. The electronic device as recited in claim 6, wherein the receiving portion projects from the one of the exterior sidewalls that is mechanically connected to the interior sidewall.

* * * * *